Dec. 30, 1941. G. ROSENFELD Re. 21,990

MACHINE FOR COVERING AN ELASTIC FILAMENT WITH YARN OR THREAD

Original Filed Sept. 6, 1940 2 Sheets-Sheet 1

INVENTOR.
George Rosenfeld
BY Irving F. Goodfriend
ATTORNEY.

Dec. 30, 1941. G. ROSENFELD Re. 21,990
MACHINE FOR COVERING AN ELASTIC FILAMENT WITH YARN OR THREAD
Original Filed Sept. 6, 1940 2 Sheets-Sheet 2
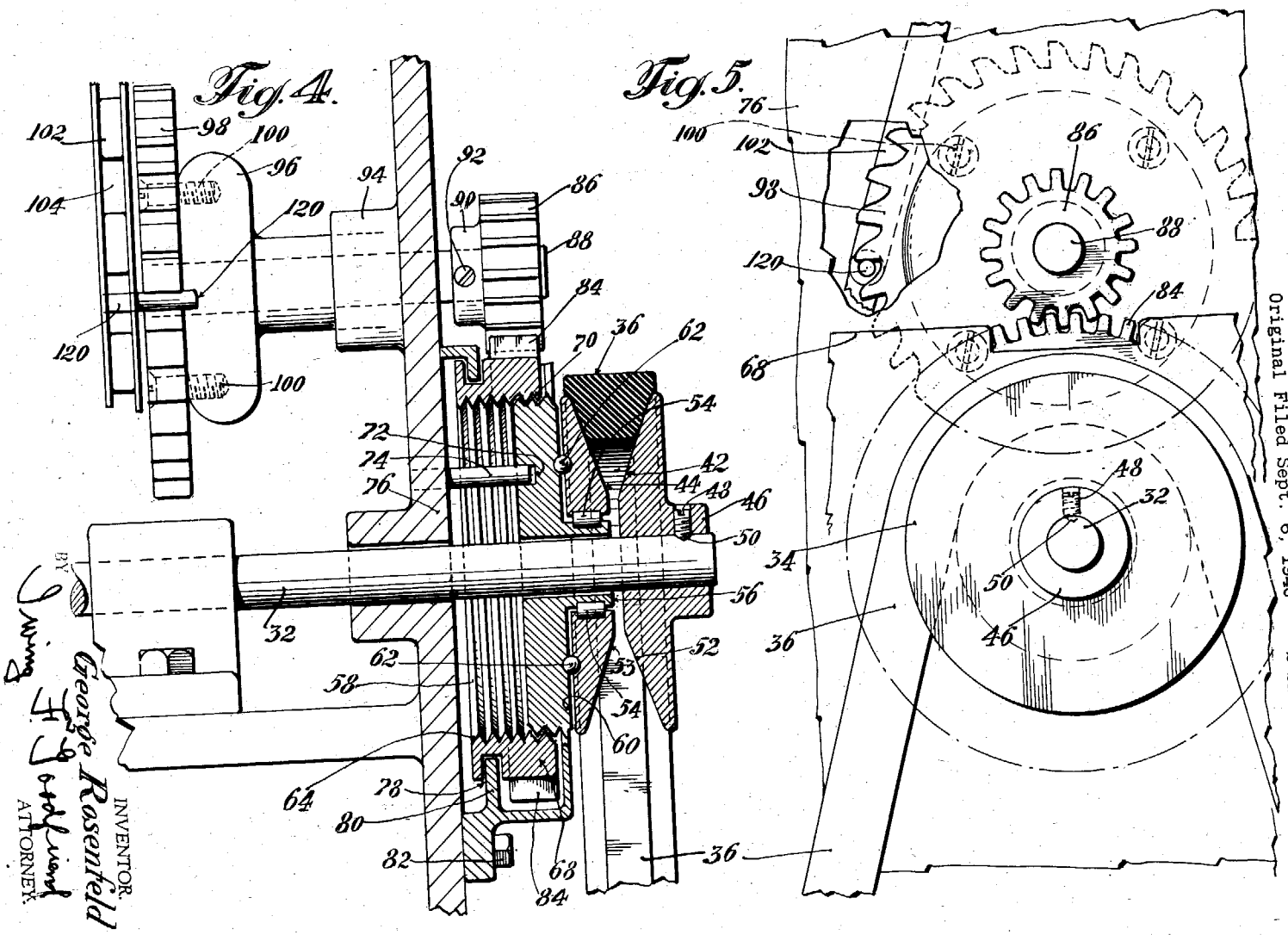
INVENTOR.
George Rosenfeld
BY Irving F. Goodfriend
ATTORNEY.

Reissued Dec. 30, 1941

Re. 21,990

UNITED STATES PATENT OFFICE 21,990

MACHINE FOR COVERING AN ELASTIC FILAMENT WITH YARN OR THREAD

George Rosenfeld, Elizabeth, N. J., assignor to Waverly Yarn Corp., Elizabeth, N. J., a corporation of New Jersey Original No. 2,229,673, dated January 28, 1941, Serial No. 355,587, September 6, 1940. Application for reissue October 20, 1941, Serial No. 415,848

19 Claims. (Cl. 57—18)

The present invention relates to an improved machine for covering an elastic filament, such as rubber, with a yarn or thread.

Elastic thread which is formed by the machine hereinafter to be described conventionally consists of an elastic core covered with textile fibres, usually with several windings of said fibres over the elastic core. The core is preferably made directly from an aqueous dispersion of rubber such as latex, such as, for example, described in the patent to Hutchison and Gibbons No. 1,545,257 granted July 7, 1925, though elastic thread of any kind and of any shape or form is contemplated. The rubber core, preferably made directly from latex, is preferably round and is covered with a relatively inelastic fibrous covering of textile material of the type desired.

The relatively inelastic fibrous covering is usually applied by winding, although any suitable and convenient manner of acquiring this covering is oftentimes employed in the manner which those skilled in the art will understand. Yarn of cotton, linen, flax, silk, rayon, wool, or the like, or mixtures of these, may be employed for the covering, and, while they may be braided about the rubber core, it is usually preferred to helically wind the same about the core.

Such elastic thread usually has wound about the rubber core an inner and outer covering of inelastic yarn. The pitch of the two windings may be the same or may be different, the relative pitch of the windings being selected with due consideration to the size and nature of the material being wound in order to obtain an approximately balanced elastic thread relatively free from a tendency to kink.

The helical windings may be of like or different material, and may consist either of one or more ends of yarn or plied yarns, depending upon the characteristics it is desired to build into the elastic yarn to meet the requirements of the service to which it is to be subjected in the fabric manufactured therefrom. In general, the rubber core, while being wound and covered, is elongated uniformly. The final size of the covered elastic thread will depend on the rubber core and the type of yarn threads and the amount of stretch given to the core while covering.

Covered elastic yarn, preferably with a round core of rubber deposited directly from an aqueous dispersion of rubber, may be made in finished sizes small enough to knit on fine gauged knitting machines and, if desired, of a size approximately the same as the yarn made wholly of textile material, with which it may be knitted if desired in alternate courses or plaited with the same.

Such elastic thread when formed into knitted and woven fabrics produces a fabric with a capacity to stretch in two directions, lengthwise and widthwise of the fabric. The fabrics formed from such threads are of particular value in foundation garments, also known as supporting garments, such as corsets, girdles, etc. They are also extensively used in forming elastic stockings and other elastic types of wearing articles.

When elastic thread consisting of an elastic filament covered by a yarn of silk, rayon, cotton, etc. is used to form a foundation garment, it is essential that the elasticity of such elastic thread be uniform. In conventional practice, such garments are made and formed on knitting or weaving machines. The garments are shaped in the course of manufacture by suitably varying the tension of said elastic threads as they are fed to the knitting needles. Unless the elasticity of the threads is uniform throughout, the garment, as it is formed in the knitting or weaving process, will be distorted and misshapen. Further, such non-uniformity will also appear as a kink or unevenness in the knitted or woven finished fabric. In many other uses of elastic thread, uniformity of elasticity is likewise essential.

In order to obtain an elastic thread of uniform characteristics, the prior art has made use of constant tension devices such as that described in Patent No. 2,098,422 to assure the elastic filament being fed at a constant speed and uniform tension to a mechanism for covering the elastic filament with the yarn. In the conventional machine for covering the filament, the filament is fed through a hollow rotating spindle in the center of a spool of yarn arranged thereon and rotating therewith. The yarn from the spool is thereby wound around the elastic filament. The speed at which the spool of yarn is rotated in the main determines the amount of yarn fed off the spool and wound around the elastic filament. But, if the spool of yarn is rotated at a constant speed, the amount of yarn fed from said spool diminishes progressively as the diameter of the yarn on the spool decreases, since the amount of yarn unwound from the spool is less for each rotation. It, therefore, follows that if the speed of rotation of the spool is constant, the amount of yarn covering the elastic filament will vary per unit length of filament covered. Such variation will produce a covered elastic thread of non-uniform characteristics. In order to cover the elastic filament with yarn uniformly throughout its length, it, therefore, becomes necessary to decrease the rate of rotation of the yarn spool as the diameter of yarn on the spool decreases.

The present invention contemplates the provision of an improved mechanism for uniformly adjusting the rate of rotation of the yarn spool in proportion to the quality of yarn fed from the spool so as to wind a uniform quantity of yarn on the elastic filament per unit length thereof.

The present invention further contemplates the provision of means for automatically, continually decreasing the speed of rotation of the spool in proportion to the quantity of yarn fed therefrom which are automatic.

Other and further objects and advantages of the present invention will become apparent from the following description and the drawings relating thereto, in which Fig. 1 is a section along the line 1—1 of Fig. 2.

Fig. 4 is an enlarged fragmentary section of the variable pulley and automatic adjusting mechanism therefor illustrated in Figs. 1 and 2.

Fig. 5 is an end view partly broken away of Fig. 4.

Figures 1, 2, 3:
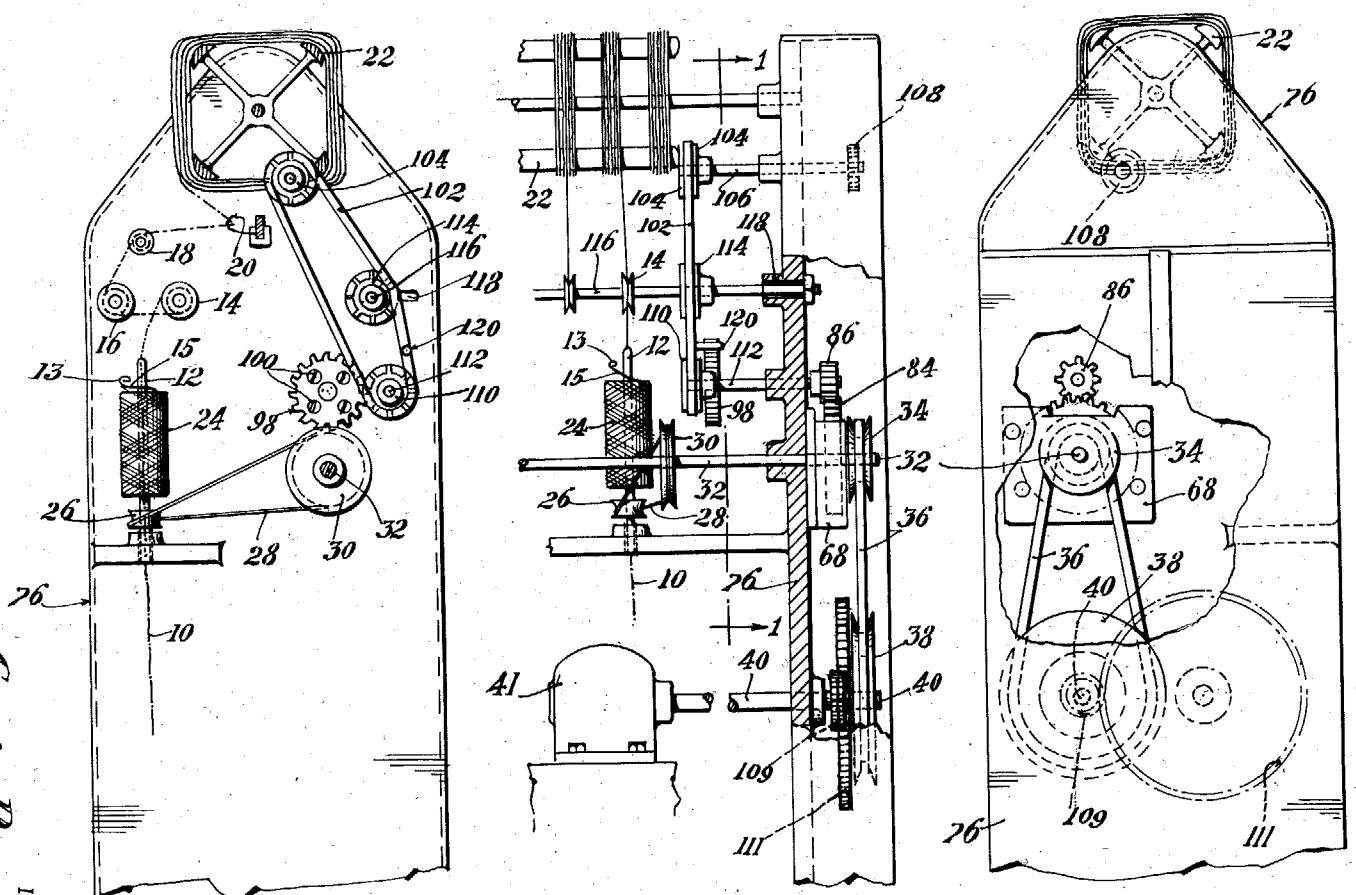
Fig. 2 is a side elevation of a part of a machine illustrating the spool driving and automatic control mechanism.
Fig. 3 is an end elevation partly broken away.

Referring now to Figs. 1 and 2, an elastic filament 10 is fed from a conventional constant tension device, which is well known in the art and since it forms no part of my invention need not be illustrated or described in detail, through a hollow spindle 12 around fixed guide pulleys 14, 16 and 18 and through a wire eyelet 20 onto a rotating frame 22. A spool of yarn 24 is arranged on the hollow spindle 12 to rotate therewith, the yarn from the spool being used to cover the elastic filament 10. The yarn passes through an eye 13 formed by a wire 15 secured to the spool. The covering mechanism is conventional and winds the yarn on the filament as the filament passes out through the upper end of the hollow spindle 12. The yarn on spool 24 may be silk, cotton, rayon, or any other desired material.

It will be understood that customarily a second spindle and spool of yarn, not illustrated in the drawings, is provided in series with the spindle 12 and spool 24 and driven concurrently therewith so that the elastic filament 18 may be first wound with one type of yarn, such as for instance cotton, and then wound with a second covering of yarn, such as for example silk.

In order to rotate the spindle 12 and the spool 24, a pulley 26 is arranged on the spindle 12 and secured thereto. The pulley 26 may be connected by a belt 28 to a pulley 30 arranged on the main driven shaft 32.

It will be understood that in the conventional machine a plurality, sometimes as many as 40, such spools and spindles are likewise connected with and driven by, such main driven shaft. Since they are similar in construction, operation and arrangement to that illustrated, it is unnecessary to repeat their illustration in the drawings.

As yarn is continually fed from spool 24, the outside diameter of the spool of yarn becomes smaller so that less yarn is fed off the spool for each rotation thereof and if the speed of rotation of the spool 24 is maintained constant less yarn would be wound on the elastic filament 10 per unit length. Since, however, it is desired that the yarn be wound uniformly on the elastic filament 10, it is necessary to continually decrease the speed of rotation of the spool to compensate for the diminution in diameter of the yarn on the spool. Inasmuch as more than one spool, oftentimes as many as forty are employed in such a machine, each spool having the same outside diameter, the adjustment is customarily made by altering the speed of rotation of the main driven shaft 32 which actuates all the spools.

To adjust the speed of rotation of this main driven shaft 32, I prefer to provide an adjustable split pulley 34 at the end thereof. The adjustable pulley 34 is connected by a belt 36 to another pulley 38 arranged on the motor shaft 40 which is in turn operatively connected to a motor 41, preferably a constant speed motor. By adjusting the pulley 34, the effective diameter of said pulley can be increased or lessened to thereby vary the speed of rotation of the main driven shaft 32.

The adjustable pulley 34 is comprised of two opposed faces 42 and 44. The face 42 is formed with a collar 46 which is secured to the shaft 32 by means of a set screw 48 passing through said collar and entering a suitable recess 50 in the shaft. The surface 52 of the face 42 tapers upwardly from the shaft and outwardly from the belt. The surface 53 of the opposed face 44 is similar in structure to the tapering surface 52. Face 44 is not fixed to the shaft 32, being arranged to rotate freely relative thereto, as will be hereinafter described.

The opposed surfaces 52 and 53, together form a V-shaped belt channel, the depth of which is, as will be described, adjustable to thereby vary, as desired, the effective pulley diameter.

The face 44 is arranged to freely rotate on roller bearings 54 which in turn are arranged around a collar 56 integral with and flanging out of an abutting cylindrical member 58. The abutting cylindrical member 58 may be provided with a wall 60 adjacent face 44, but separated therefrom by thrust ball bearings 62.

It is apparent that the face 44 may rotate freely without corresponding rotation of the abutting cylindrical member 58, the thrust ball bearings 62 and the roller bearings 54 serving to separate the two. The cylindrical member 58 and its collar 56 are loosely arranged around the shaft 32, but are not fixed thereto so that the shaft rotates without rotating the cylindrical member 58. The cylindrical member 58 serves to maintain face 44 in fixed relation to the opposed face 42.

It is seen that when face 44 is moved away from face 42, the depth of the V-shaped belt channel will increase and the belt 36 will descend thereinto, thereby decreasing the effective diameter of said pulley and causing said pulley and the shaft 32 to rotate more rapidly. From the foregoing, it is apparent that by adjusting the distance between face 44 and face 42, the speed of rotation of shaft 32 can be varied.

In the prior art machines, means have been provided to compensate for the change in diameter of the yarn spools by having the machine operator manually adjust the relative speeds of the motor drive shaft and the driven shaft. All said prior methods defeated their purposes by imposing on the operator the duty of making the adjustment when, in his or her judgment, the operator thought it should be made.

In practice, this was left entirely to the discretion of the operator, who after he, or she, thought the diameter of the spools 24 had decreased to an extent whereby the tension of the covered elastic thread had varied, would stop the machine or take up a sufficient length of covered elastic while the machine was in operation and test the elasticity of the covered thread by measuring the maximum elongation of a unit length of thread. Since said adjustments depended on the judgment of the operator who was not a "skilled laborer", uniform tension of the elastic thread was never obtained and in many instances the covered elastic thread fed from the machine had to be discarded.

My invention, therefore, contemplates automatically in continual periodic progression, without any attention of the operator, for a selected quantity of yarn fed from the spool 24, decreasing the speed of rotation of the main driven shaft 32 to compensate for the decrease in outside diameter of the yarn on the spool.

This variation in the speed of the main driven shaft 32 can be accomplished by periodically changing the effective diameter of the adjustable split pulley 34. This can be accomplished by moving the cylindrical member 58 laterally along the shaft 32 to thereby move the face 44 in relation to face 42.

For this purpose, the cylindrical member 58 may be provided with external threads 64. A rotatable cylindrical housing 68 for the member 58 is provided with the internal threads 70 which engage the external threads 64 of the cylindrical member.

The cylindrical member 58 may be prevented from rotating by any suitable means, such as by providing an opening 72 therein into which a pin 74, arranged on the frame 76 of the machine, projects. The pin 74 restrains the cylindrical member 58 from rotating while permitting lateral movement thereof. The cylindrical housing 68 is adapted to be rotated, but not to move laterally so that when it is rotated its internal threads 70 will operate against the external threads 64 of the cylindrical member 58 and force the cylindrical member to move laterally and to move the movable pulley face 44 relative to the fixed pulley face 42.

To permit rotation of the housing 68 without lateral movement thereof, an annular circumferential slot 78 may be provided therein. An annular flange 80, which may be secured to the frame 76 by any suitable means such as a bolt 82, enters the annular slot 78 and, while permitting rotation of the housing 68, serves to prevent the housing from moving laterally.

For rotating the housing 68, gear teeth 84 may be arranged on the outside perimeter thereof. These gear teeth are adapted to mesh with a gear 86 arranged on a countershaft 88. The gear 86 may be secured to the shaft 88 by providing a collar 90 integral with the gear 86 and having a set screw 92 passing through said collar and adapted to engage the shaft 88. It will be seen by loosening the set screw, the gear 86 may be turned, thereby rotating the housing 68 and adjusting the split pulley 34 without turning the countershaft 88. This provides means for setting the pulley without respect to the rotation of the shaft 88.

Countershaft 88 may be journalled in the frame 76 and in the boss 94 arranged thereon. The shaft 88 preferably terminates in a knob 96, which is used to return the parts to their original starting position after the spool of yarn 24 has been completely used. In order to automatically and periodically, in continual progression, rotate the countershaft 88 and thereby move the adjustable face 44 away from the face 42 as the machine is operated, a ratchet-toothed wheel 98 may be provided secured to the knob 96 by any suitable means such as screws 100 passing through the wheel 98 and entering internally-threaded openings in knob 96.

To automatically and periodically adjust the speed of driven shaft 32, in continual progression, after a selected quantity of yarn has been fed from the spool 24, the ratchet-toothed wheel 98 is arranged to be periodically actuated so as to periodically turn the gear 86 and adjust the variable pulley 34. For this purpose, the ratchet-toothed wheel 98 may be arranged adjacent a chain 102. The chain 102 is engaged by the driving sprocket 104, secured to a shaft 106.

To drive the chain 102 concurrently with rotation of the spool of yarn 24, when the machine is operated, I connect the gear 108, secured on the countershaft 106, by means of a conventional set of transmission gears to the motor shaft 40.

Since it takes a relatively long period to wind enough yarn from the spool 24 onto the elastic filament before the diameter of the spool of yarn is reduced sufficiently to affect the tension of the covered elastic thread, it will be understood that the periods between turning the gear 86 and adjusting the pulley 34 will be comparatively large, in actual practice as high as five minutes.

The gear 109, of the set of transmission gears, arranged on the motor shaft 40 is a relatively small one, whereas the driven gear 111 is quite a large one. It is not necessary to illustrate the intervening gears of the set of transmission gears between gear 111 and gear 108 since they are conventional. It will be understood that, if desired, any other form of transmission may be used, such as a belt and set of pulleys.

The chain 102 engages a second sprocket 110 arranged on a countershaft 112 journalled in the frame 76. The tension of the chain 102 may be adjusted by providing an idler sprocket 114 around which the chain rides, the idler sprocket 114 being rotatably arranged on a fixed shaft 114 passing through a slot 118 in the frame 76. By moving the shaft 116 along the slot 118, the idler 114 is moved so as to adjust the tension of chain 102.

It will be understood that the speed of rotation of the sprocket shaft 106 is fixed in relation to the speed of rotation of the spool 24 and the relative speed is dependent upon many factors such as the diameter of the rubber core, the type of yarn used, and the tension desired for the finished covered product. Such relation may be varied by well known means such as adjusting the size of respective pulleys.

In order to have the chain 102 actuate the ratchet wheel 98 sequentially at the selected periods, a pin 120 is affixed to the chain, the teeth of the ratchet wheel 98 being arranged in the path of the pin to be engaged thereby. Every time the pin passes the ratchet-toothed wheel 98, upon a complete rotation of the chain, it engages one of said teeth and turns the ratchet-toothed wheel 98 a small predetermined distance. As has been explained hereinabove, when the ratchet-toothed wheel 98 turns, the effective diameter of the variable pulley 34 is adjusted. The mechanism is so arranged that each time the pin 120 engages one of the teeth of the ratchet-toothed wheel 98, the plate 44 of the variable pulley 34 being arranged to move toward or away from plate 42, thus increasing or decreasing the effective diameter of the pulley and thereby decreasing or increasing the speed of rotation of shaft 32.

From the foregoing, it will be seen that as the elastic filament covering machine is operated and yarn is being removed from the spool or spools, the pin 120 on chain 102 engages and actuates ratchet-toothed wheel 98 once in every complete rotation of the chain in order to thereby slightly decrease the speed of the main driven shaft 32 and the speed of rotation of the spools, automatically and in continual periodic progression for each selected length of yarn fed from the spool and wound around the elastic filament.

It is at once apparent that the quantity of yarn wound around a unit length of elastic filament will be uniform throughout the length of the covered elastic thread produced by the machine.

Depending upon various factors involved, such as the type of yarn, diameter of elastic filament, rate of feed, initial diameter of spool of yarn, rate of rotation thereof, etc., it may be desired to alter the frequency of adjustment of the diameter of the split pulley. Different means of accomplishing this will suggest themselves to one skilled in the art, one such means being the provision of additional pins uniformly spaced from each other on the timing chain 102 so that the ratchet wheel will be moved more often during the rotation of the chain.

While I have described the specific details of one embodiment of my invention, it will be understood, of course, that various changes may be made thereto without departing from the spirit thereof and I, therefore, intend to be limited only by the scope of the appended claims in view of the prior art.

I claim:

1. In a machine for winding a covering of yarn about an elastic filament, said filament being fed through the machine at a constant and predetermined tension and speed, means for winding yarn on the elastic filament including rotatable spindle, adapted to have a spool of yarn arranged thereon, said spindle having a central opening therein through which the elastic filament is fed, means for rotating the spindle including a driving shaft, a driven shaft operatively connected to the spindle for rotating the spindle, a pulley arranged on the driving shaft, an adjustable pulley arranged on the driven shaft, a belt connecting said pulleys, said adjustable pulley being comprised of a face fixed on the driven shaft and a movable face loosely arranged on said driven shaft and adapted to be moved relative to the fixed face to vary the effective diameter of the adjustable pulley and thereby vary the speed of rotation of the driven shaft, means for periodically and automatically adjusting the adjustable pulley including a pair of sprockets, one of said sprockets being operatively connected with the driving shaft and rotated thereby, a timing chain connecting said sprockets, a pin carried on said timing chain, a ratchet-toothed wheel arranged in the path of said pin, said pin being adapted to engage a tooth of the ratchet-toothed wheel upon each complete rotation of said chain, said pin being adapted to turn the wheel a selected distance, a shaft on which said ratchet-toothed wheel is arranged, a gear arranged on said shaft and adapted to be rotated therewith, a rotatable housing having external gear teeth arranged to mesh with the last mentioned gear and having an internal thread, a cylindrical member arranged within the housing and having an external thread engaging the internal thread of the housing, means for preventing rotation of the cylindrical member, a thrust bearing arranged between the cylindrical member and the movable face of the adjustable pulley, said cylindrical member being adapted to be moved laterally by the rotation of the housing to adjust the effective diameter of the adjustable pulley and thereby regulate the speed of rotation of the driven shaft.

2. In a machine for winding a covering of yarn about an elastic filament, said filament being fed through the machine at a constant and predetermined speed, means for winding yarn on the filament fed through the machine including a rotatable spindle adapted to have arranged thereon a spool of the yarn which is to be wound around the filament, means for rotating the spindle including a driving shaft and a driven shaft, means for operatively connecting said shafts together, said connecting means being adjustable to vary the relative speed of the driven shaft, and means operatively connected to the connecting means for adjusting the connecting means in continual progression.

3. In a machine for winding a covering of yarn about an elastic filament, said filament being fed through the machine at a constant and predetermined speed, means for winding yarn on the filament fed through the machine including a rotatable spindle adapted to have arranged thereon a spool of the yarn which is to be wound around the filament, means for rotating the spindle including a driving shaft and a driven shaft, means for operatively connecting said shafts together, said connecting means being adjustable to vary the relative speed of the driven shaft, and means operatively connected to the connecting means for adjusting the connecting means in continual progression, including a pair of sprocket wheels, one of said sprocket wheels being driven by the driving shaft, a timing chain connecting said sprockets, a pin carried on said timing chain, and means connected to the connecting means and arranged in the path of said pin and adapted to be actuated thereby for adjusting the connecting means.

4. In a machine for winding a covering of yarn about an elastic filament, said filament being fed through the machine at a constant and predetermined speed, means for winding yarn on the filament fed through the machine including a rotatable spindle adapted to have arranged thereon a spool of the yarn which is to be wound around the filament, means for rotating the spindle including a driving shaft and a driven shaft, means for operatively connecting said shafts together including a pulley arranged on the driving shaft, an adjustable pulley arranged on the driven shaft, a belt connecting said pulleys, and means operatively connected to the adjustable pulley for adjusting the adjustable pulley in continual progression.

5. In a machine for winding a covering of yarn about an elastic filament, said filament being fed through the machine at a constant and predetermined speed, means for winding yarn on the filament fed through the machine including a rotatable spindle adapted to have arranged thereon a spool of the yarn which is to be wound around the filament, means for rotating the spindle including a driving shaft and a driven shaft, means for operatively connecting said shafts together including a pulley arranged on the driving shaft, an adjustable pulley arranged on the driven shaft, a belt connecting said pulleys, and means operatively connected to the adjustable pulley for adjusting the adjustable pulley in continual progression including a pair of sprocket wheels, one of said sprocket wheels being driven by the driving shaft, a timing chain connecting said sprockets, a pin carried on said timing chain, and means connected to the adjustable pulley and arranged in the path of said pin and adapted to be actuated thereby for adjusting the adjustable pulley.

6. In a machine for winding a covering of yarn about an elastic filament, said filament being fed through the machine at a constant and predetermined speed, means for winding yarn on the filament fed through the machine including a rotatable spindle adapted to have arranged thereon a spool of the yarn which is to be wound around the filament, means for rotating the spindle including a driving shaft and a driven shaft, means for operatively connecting said shafts together including a pulley arranged on the driving shaft, an adjustable pulley arranged on the driven shaft, a belt connecting said pulleys, said adjustable pulley comprising a fixed face secured to the driven shaft and a movable face loosely arranged on said driven shaft and adapted to be moved to vary the effective diameter of the adjustable pulley, and means operatively connected to the movable face for moving the movable face in continual progression.

7. In a machine for winding a covering of yarn about an elastic filament, said filament being fed through the machine at a constant and predetermined speed, means for winding yarn on the filament fed through the machine including a rotatable spindle adapted to have arranged thereon a spool of the yarn which is to be wound around the filament, means for rotating the spindle including a driving shaft and a driven shaft, means for operatively connecting said shafts together including a pulley arranged on the driving shaft, an adjustable pulley arranged on the driven shaft, a belt connecting said pulleys, said adjustable pulley comprising a fixed face secured to the driven shaft and a movable face loosely arranged on said driven shaft and adapted to be moved to vary the effective diameter of the adjustable pulley, and means operatively connected to the movable face for moving the movable face in continual progression, including a pair of sprocket wheels, one of said sprocket wheels being driven by the driving shaft, a timing chain connecting said sprockets, a pin carried on said timing chain, and means connected to the movable face and arranged in the path of said pin and adapted to be actuated thereby for moving the movable face.

8. In a machine for winding a covering of yarn about an elastic filament, said filament being fed through the machine at a constant and predetermined speed, means for winding yarn on the filament fed through the machine including a rotatable spindle adapted to have arranged thereon a spool of the yarn which is to be wound around the filament, means for rotating the spindle including a driving shaft and a driven shaft, means for operatively connecting said shafts together including a pulley arranged on the driving shaft, an adjustable pulley arranged on the driven shaft, a belt connecting said pulleys, said adjustable pulley comprising a fixed face secured to the driven shaft and a movable face loosely arranged on said driven shaft and adapted to be moved to vary the effective diameter of the adjustable pulley, a cylindrical member arranged on the driven shaft adjacent the movable face, said cylindrical member having an external thread, a thrust bearing between the cylindrical member and the movable face, means for preventing rotation of the cylindrical member, a rotatable housing for said cylindrical member having an internal thread engaging the external thread of said cylindrical member, and means operatively connected to the housing for rotating the housing in continual progression.

9. In a machine for winding a covering of yarn about an elastic filament, said filament being fed through the machine at a constant and predetermined speed, means for winding yarn on the filament fed through the machine including a rotatable spindle adapted to have arranged thereon a spool of the yarn which is to be wound around the filament, means for rotating the spindle including a driving shaft and a driven shaft, means for operatively connecting said shafts together, including a pulley arranged on the driving shaft, an adjustable pulley arranged on the driven shaft, a belt connecting said pulleys, said adjustable pulley comprising a fixed face secured to the driven shaft and a movable face loosely arranged on said driven shaft and adapted to be moved to vary the effective diameter of the adjustable pulley, a cylindrical member arranged on the driven shaft adjacent the movable face, said cylindrical member having an external thread, a thrust bearing between the cylindrical member and the movable face, means for preventing rotation of the cylindrical member, a rotatable housing for said cylindrical member having an internal thread engaging the external thread of said cylindrical member, gear teeth arranged on the perimeter of the housing, a gear meshed with the said housing gear teeth, a shaft on which said gear is arranged, and means operatively connected to the shaft for rotating the shaft in continual progression.

10. For arrangement in a machine for winding a covering of yarn about an elastic filament; said filament being fed through the machine at a constant and predetermined speed and said machine having means for winding yarn on the filament fed through the machine, said winding means including a rotatable spindle adapted to have arranged thereon a spool of the yarn which is to be wound around the filament, said machine having means for rotating the spindle which include a driving shaft and a driven shaft, said machine having means for operatively connecting said shafts together, which connecting means are adjustable to vary the relative speed of the driven shaft, means operatively connected thereto, for periodically adjusting in continual progression the said connecting means, said adjusting means including a member operatively engaging the said connecting means.

11. In a machine for winding a covering of yarn about an elastic filament fed through the machine, said machine having means for winding yarn on the filament fed through the machine including means for feeding the elastic filament through the machine and a rotating spool of the yarn which is to be wound around the filament, operating means for the yarn winding means and including a driving shaft and a driven shaft, means for operatively connecting said shafts together, said connecting means being adjustable to vary the relative speed of the driven shaft, and means operatively connected to the connecting means for adjusting the connecting means in continual progression.

12. In a machine for winding a covering of yarn about an elastic filament fed through the machine, said machine having means for winding yarn on the filament fed through the machine including means for feeding the elastic filament through the machine and a rotating spool of the yarn which is to be wound around the filament, operating means for the yarn winding means and including a driving shaft and a driven shaft, means for operatively connecting said shafts together including a pulley arranged on the driving shaft, an adjustable pulley arranged on the driven shaft, a belt connecting said pulleys, and means operatively connected to the adjustable pulley for adjusting the adjustable pulley in continual progression.

13. In a machine for winding a covering of yarn about an elastic filament fed through the machine, said machine having means for winding yarn on the filament fed through the machine including means for feeding the elastic filament through the machine and a rotating spool of the yarn which is to be wound around the filament, operating means for the yarn winding means and including a driving shaft and a driven shaft, means for operatively connecting said shafts together including a pulley arranged on the driving shaft, an adjustable pulley arranged on the driven shaft, a belt connecting said pulleys, and means operatively connected to the adjustable pulley for adjusting the adjustable pulley in continual progression including a pair of sprocket wheels, one of said sprocket wheels being driven by the driving shaft, a timing chain connecting said sprockets, a pin carried on said timing chain, and means connected to the adjustable pulley and arranged in the path of said pin and adapted to be actuated thereby for adjusting the adjustable pulley.

14. In a machine for winding a covering of yarn about an elastic filament fed through the machine, said machine having means for winding yarn on the filament fed through the machine including means for feeding the elastic filament through the machine and a rotating spool of the yarn which is to be wound around the filament, operating means for the yarn winding means and including a driving shaft and a driven shaft, means for operatively connecting said shafts together including a pulley arranged on the driving shaft, an adjustable pulley arranged on the driven shaft, a belt connecting said pulleys, said adjustable pulley comprising a fixed face secured to the driven shaft and a movable face loosely arranged on said driven shaft and adapted to be moved to vary the effective diameter of the adjustable pulley, and means operatively connected to the movable face for moving the movable face in continual progression.

15. In a machine for winding a covering of yarn about an elastic filament fed through the machine, said machine having means for the yarn winding means and for winding yarn on the filament fed through the machine including means for feeding the elastic filament through the machine and a rotating spool of the yarn which is to be wound around the filament, operating means for the yarn winding means and including a driving shaft and a driven shaft, said machine having means for operatively connecting said shafts together, which connecting means are adjustable to vary the relative speed of the driven shaft, means operatively connected thereto, for periodically adjusting in continual progression the said connecting means, said adjusting means including a member operatively engaging the said connecting means.

16. In a machine for winding a covering of yarn about an elastic filament fed through the machine, said machine having means for winding yarn on the filament fed through the machine including means for feeding the elastic filament through the machine and a rotating spool of the yarn which is to be wound around the filament, operating means for the yarn winding means and including a driving shaft and a driven shaft, means for operatively connecting said shafts together including a pulley arranged on the driving shaft, an adjustable pulley arranged on the driven shaft, a belt connecting said pulleys, said adjustable pulley comprising a fixed face secured to the driven shaft and a movable face loosely arranged on said driven shaft and adapted to be moved to vary the effective diameter of the adjustable pulley, and means operatively connected to the movable face for moving the movable face in continual progression, including a pair of sprocket wheels, one of said sprocket wheels being driven by the driving shaft, a timing chain connecting said sprockets, a pin carried on said timing chain, and means connected to the movable face and arranged in the path of said pin and adapted to be actuated thereby for moving the movable face.

17. In a machine for winding a covering of yarn about an elastic filament fed through the machine, said machine having means for winding yarn on the filament fed through the machine including means for feeding the elastic filament through the machine and a rotating spool of the yarn which is to be wound around the filament, operating means for the yarn winding means and including a driving shaft and a driven shaft, means for operatively connecting said shafts together including a pulley arranged on one of said shafts, an adjustable pulley arranged on the other of said shafts, a belt connecting said pulleys, said adjustable pulley comprising a fixed face secured to the first mentioned of said shafts and a movable face loosely arranged on said first mentioned shaft and adapted to be moved to vary the effective diameter of the said adjustable pulley, and means operatively connected to said movable face for moving said movable face in continual progression.

18. In a machine for winding a covering of yarn about an elastic filament fed through the machine, said machine having means for winding yarn on the filament fed through the machine including means for feeding the elastic filament through the machine and a rotating spool of the yarn which is to be wound around the filament, operating means for the yarn winding means and including a driving shaft and a driven shaft, means for operatively connecting said shafts together including a pulley arranged on one of said shafts, an adjustable pulley arranged on the other of said shafts, a belt connecting said pulleys, said adjustable pulley comprising a fixed face secured to the shaft on which the pulley is arranged and a movable face loosely arranged on said shaft, said movable face adapted to be moved to vary the effective diameter of the adjustable pulley, and means operatively connected to the movable face for moving said movable face in continual progression, including a pair of sprocket wheels, one of said sprocket wheels being driven by the driving shaft, a timing chain connecting said sprockets, a pin carried on said timing chain, and means connected to the movable face and arranged in the path of said pin and adapted to be actuated thereby for moving the movable face.

19. In a machine for winding a covering of yarn about an elastic filament fed through the machine, said machine having means for winding yarn on the filament fed through the machine including means for feeding the elastic filament through the machine and a rotating spool of the yarn which is to be wound around the filament, operating means for the yarn winding means and including a driving shaft and a driven shaft, means for operatively connecting said shafts together including a pulley arranged on one of said shafts, an adjustable pulley arranged on the other of said shafts, means connecting said pulleys and means operatively connected to the adjustable pulley for adjusting said adjustable pulley in continual progression, said adjusting means including a pair of sprocket wheels, one of said sprocket wheels being driven by the driving shaft, a timing chain connecting said sprockets, a pin carried on said timing chain, and means connected to the adjustable pulley and arranged in the path of said pin adapted to be actuated thereby for adjusting the adjustable pulley.

GEORGE ROSENFELD.